United States Patent
Ismail et al.

(10) Patent No.: US 11,809,256 B2
(45) Date of Patent: Nov. 7, 2023

(54) QUALITY OF SERVICE TIER THERMAL CONTROL

(71) Applicant: Apple Inc., Cupertino, CA (US)

(72) Inventors: James S. Ismail, Sunnyvale, CA (US); Bryan R. Hinch, Campbell, CA (US); Evan M. Hoke, Cupertino, CA (US); Andrei Dorofeev, Cupertino, CA (US); Shirin Dadashi, Cupertino, CA (US); Mohsen Heidarinejad, Cupertino, CA (US); Reza Arastoo, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 59 days.

(21) Appl. No.: 17/521,567

(22) Filed: Nov. 8, 2021

(65) Prior Publication Data
US 2022/0147132 A1 May 12, 2022

Related U.S. Application Data

(60) Provisional application No. 63/111,410, filed on Nov. 9, 2020.

(51) Int. Cl.
*G06F 1/3228* (2019.01)
*G06F 1/3215* (2019.01)
*G06F 1/20* (2006.01)

(52) U.S. Cl.
CPC .......... *G06F 1/3228* (2013.01); *G06F 1/206* (2013.01); *G06F 1/3215* (2013.01)

(58) Field of Classification Search
CPC ........ G06F 1/203; G06F 1/206; G06F 1/3215; G06F 1/3228; G06F 1/3203; G06F 1/3206; G06F 1/329; G06F 9/5094; Y02D 10/00

USPC .......................................................... 713/323
See application file for complete search history.

(56) References Cited

U.S. PATENT DOCUMENTS

| 8,984,523 B2 * | 3/2015 | Vajda ..................... G06F 1/3287 713/323 |
| 10,996,725 B2 * | 5/2021 | Li .............................. G06F 1/26 |
| 2013/0124810 A1 * | 5/2013 | Carter ...................... G06F 12/08 711/171 |
| 2014/0149753 A1 * | 5/2014 | Park ....................... G06F 1/3265 713/300 |
| 2014/0298349 A1 | 10/2014 | Jackson |

(Continued)

FOREIGN PATENT DOCUMENTS

WO   2021021191 A1   2/2021

OTHER PUBLICATIONS

International Search Report and Written Opinion for PCT/US2021/058548; 22 pages; dated Mar. 2, 2022.

*Primary Examiner* — Chun Cao
(74) *Attorney, Agent, or Firm* — Kowert, Hood, Munyon, Rankin & Goetzel, P.C.

(57) ABSTRACT

Embodiments are presented herein of, inter alia, systems, devices, and associated methods for allocating and distributing power management budgets for classes of tasks being executed by a computer system, based on thermal feedback loops. Specifically, multiple quality-of-service (QoS) tiers may be defined, and each QoS tier may be allocated power based on a different set of thermal feedback loops. QoS tiers including tasks that are invisible to the user may be mitigated more aggressively than QoS tiers including tasks that are visibly supporting user operations.

20 Claims, 2 Drawing Sheets

(56) References Cited

U.S. PATENT DOCUMENTS

| | | | |
|---|---|---|---|
| 2014/0359324 A1* | 12/2014 | Park | G06F 1/3206 |
| | | | 713/320 |
| 2015/0143142 A1* | 5/2015 | Park | G06F 9/44505 |
| | | | 713/320 |
| 2018/0232032 A1 | 8/2018 | Wang et al. | |
| 2019/0041967 A1* | 2/2019 | Ananthakrishnan | |
| | | | G06F 1/3243 |
| 2019/0104480 A1 | 4/2019 | Hasholzner et al. | |
| 2021/0081020 A1 | 3/2021 | Ghose | |
| 2021/0117242 A1 | 4/2021 | Van de Groenendaal et al. | |

\* cited by examiner

QUALITY OF SERVICE TIER THERMAL CONTROL

PRIORITY INFORMATION

This application claims priority to U.S. provisional patent application Ser. No. 63/111,410, entitled "Quality of Service Tier Thermal Control," filed Nov. 9, 2020, which is hereby incorporated by reference in its entirety as though fully and completely set forth herein.

FIELD

Embodiments described herein are related to the field of thermal control of computing devices, and more particularly to closed-loop power management of computing devices for managing thermal parameters.

DESCRIPTION OF THE RELATED ART

An electronic device, such as a desktop computer, laptop computer, smartphone, system-on-a-chip (SoC), etc., may include one or more processor cores as well as multiple other circuits such as co-processors, audio and video circuits, networking and communication interfaces, and the like, all of which generate heat within the device. Improvements are desired in managing such thermal conditions for an improved user experience.

SUMMARY

Embodiments are presented herein of, inter alia, systems, devices, and associated methods for allocating and distributing power management budgets for power usage clients of a computer system, based on thermal feedback loops. Specifically, multiple quality-of-service (QoS) tiers may be defined, and each QoS tier may be allocated power based on a different set of thermal feedback loops.

A method is disclosed for power management in a computing device. A first power budget may be generated for a first quality of service (QoS) tier, and a second power budget may be generated for a second QoS tier. Resources may be allocated to each of the first QoS tier and the second QoS tier such that power consumption of the allocated resources does not exceed the power budget of the respective QoS tier.

In some scenarios, at least one of the first QoS tier or the second QoS tier may include tasks associated with a particular software application being executed by the computing device.

In some scenarios, the first QoS tier may include processing tasks supporting any software application that is presently in the focus of a graphical user interface (GUI) of the computing device, and the first QoS tier may have a larger power budget than the second QoS tier.

In some scenarios, allocating resources to a QoS tier may include at least one of: managing voltage levels to one or more processors executing processing tasks included in the QoS tier; managing how frequently the processing tasks included in the QoS tier have access to a processor; determining which processor of a plurality of processors to allocate for executing a task included in the QoS tier, wherein the plurality of processors have different power efficiencies; managing how frequently graphical updates are performed for a task included in the QoS tier; or managing how frequently a task included in the QoS tier is provided access to communications circuitry.

In some scenarios, generating the first power budget may include adjusting the first power budget based on an estimate of a temperature level at a particular point within the computing device. In some such scenarios, the temperature level may represent an estimated temperature at a location on an exterior case of the computing device.

In some scenarios, generating the first power budget may include adjusting the first power budget based on an estimate of a current rotation rate of a fan of the computing device.

In some scenarios, generating the first power budget may include adjusting the first power budget based on a first set of thermal feedback loops. Generating the second power budget may include adjusting the second power budget based on a second set of thermal feedback loops.

An apparatus is disclosed, which may include power management circuitry and at least one processor communicatively coupled to the power management circuitry. The power management circuitry may be configured to generate a respective power budget for each of a plurality of quality of service (QoS) tiers, wherein each of the QoS tiers includes one or more processing tasks. The at least one processor may be configured to perform the processing tasks included in plurality of QoS tiers in a manner such that power consumption of the processing tasks included in each QoS tier does not exceed the power budget of the respective QoS tier.

In some scenarios, a first QoS tier of the plurality of QoS tiers may include tasks associated with a particular software application.

In some scenarios, a first QoS tier of the plurality of QoS tiers may include processing tasks supporting any software application that is presently in the focus of a graphical user interface (GUI), and the first QoS tier may have a larger power budget than a second QoS tier of the plurality of QoS tiers.

In some scenarios, performing the processing tasks included in a first QoS tier of the plurality of QoS tiers in a manner such that power consumption of the processing tasks included in the first QoS tier does not exceed the power budget of the first QoS tier may include at least one of: performing the processing tasks included in the first QoS tier with a reduced voltage level at the at least one processor; limiting how frequently the processing tasks included in the first QoS tier have access to the at least one processor; performing the processing tasks included in the first QoS tier with a high-efficiency processor of the at least one processor; limiting how frequently graphical updates are performed for a task included in the first QoS tier; or limiting how frequently a task included in the first QoS tier is provided access to communications circuitry.

In some scenarios, generating a power budget for the first QoS tier may include adjusting the power budget for the first QoS tier based on a measurement or estimate of a temperature level. In some such scenarios, the temperature level may represent an estimated temperature at a location on an exterior case of a computing device in which the apparatus is located. In some such scenarios, generating the power budget for the first QoS tier may include reducing the power budget for the first QoS tier based on the measurement or estimate of the temperature level exceeding a predetermined threshold.

In some scenarios, generating a power budget for a first QoS tier of the plurality of QoS tiers may include adjusting the power budget for the first QoS tier based on a measurement or estimate of a current rotation rate of a fan controlled by the apparatus. In some such scenarios, generating the power budget for the first QoS tier may include reducing the power budget for the first QoS tier based on the measurement or estimate of the current rotation rate of the fan exceeding a predetermined threshold.

In some scenarios, the power management circuitry may include a plurality of thermal feedback loops, and generating a respective power budget for each of the plurality of QoS tiers may include adjusting the respective power budget based on a respective set of the thermal feedback loops. In some such scenarios, generating the respective power budget for each of the plurality of QoS tiers may include: reducing the power budget of a first QoS tier by a first amount in response to detecting that a current thermal state metric meets a first thermal state threshold; reducing the power budget of a second QoS tier by a second, different amount in response to detecting that the current thermal state metric meets the first thermal state threshold; and reducing the power budget of a third QoS tier in response to detecting that the current thermal state metric meets a second, different thermal state threshold.

A computing device is disclosed, which may include power management circuitry configured to allocate a respective power budget to each of a plurality of quality of service (QoS) tiers, wherein each of the QoS tiers includes one or more processing tasks. The power management circuitry may be further configured to control a thermal state of the computing device by adjusting the respective power budget of one or more QoS tiers of the plurality of QoS tiers, based on one or more current thermal state metrics of the computing device, wherein the respective power budges of the one or more QoS tiers may be adjusted independent of each other.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Incorporation by Reference

The following references are hereby incorporated by reference as if fully set forth herein:

U.S. Pat. No. 9,128,721, titled "Closed Loop CPU Performance Control"

U.S. Pat. No. 7,451,332, titled "Methods and Apparatuses for Controlling the Temperature of a Data Processing System"

U.S. Pat. No. 8,306,772, titled "Method for Estimating Temperature at a Critical Point"

U.S. patent application Ser. No. 16/889,232, titled "Coherent Power Management System"

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices including multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke interpretation under 35 U.S.C. § 112(f) for that unit/circuit/component.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Figure 1:
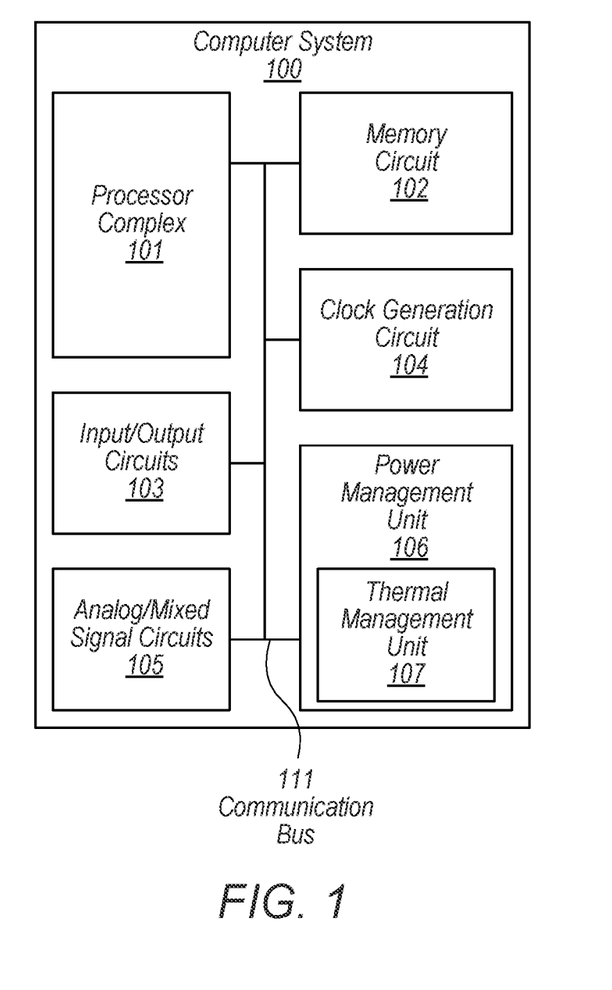
FIG. 1 is a block diagram illustrating a computer system, according to some embodiments.

FIG. 1—Computer System

Thermal and power management systems, such as those described herein, may be used in a variety of computer systems, such as a desktop computer, laptop computer, smartphone, tablet, wearable device, set-top box, gaming system, etc. In some embodiments, the systems described herein may be implemented on a system-on-chip (SoC) or other type of integrated circuit. A block diagram illustrating an embodiment of computer system 100 that includes the disclosed systems is illustrated in FIG. 1. As shown, computer system 100 includes processor complex 101, memory circuit 102, input/output circuits 103, clock generation circuit 104, analog/mixed-signal circuits 105, and power management unit 106. These functional circuits are coupled to each other by communication bus 111.

Processor complex 101, in various embodiments, may be representative of a general-purpose processor that performs computational operations. For example, processor complex 101 may be a central processing unit (CPU) such as a microprocessor, a microcontroller, an application-specific integrated circuit (ASIC), or a field-programmable gate array (FPGA). In some embodiments, processor complex 101 may correspond to a special purpose processing core, such as a graphics processor, audio processor, or neural processor, while in other embodiments, processor complex 101 may correspond to a general-purpose processor configured and/or programmed to perform one such function. Processor complex 101, in some embodiments, may include a plurality of general and/or special purpose processor cores as well as supporting circuits for managing, e.g., power signals, clock signals, and memory requests. In addition, processor complex 101 may include one or more levels of cache memory to fulfill memory requests issued by included processor cores.

Memory circuit 102, in the illustrated embodiment, includes one or more memory circuits for storing instructions and data to be utilized within computer system 100 by processor complex 101. In various embodiments, memory circuit 102 may include any suitable type of memory such as a dynamic random-access memory (DRAM), a static random access memory (SRAM), a read-only memory (ROM), electrically erasable programmable read-only memory (EEPROM), or a non-volatile memory, for example. It is noted that in the embodiment of computer system 100, a single memory circuit is depicted. In other embodiments, any suitable number of memory circuits may be employed.

Input/output circuits 103 may be configured to coordinate data transfer between computer system 100 and one or more peripheral devices. Such peripheral devices may include, without limitation, storage devices (e.g., magnetic or optical media-based storage devices including hard drives, tape drives, CD drives, DVD drives, etc.), audio processing subsystems, user I/O devices, cooling systems such as fans, or any other suitable type of peripheral devices. In some embodiments, input/output circuits 103 may be configured to implement a version of Universal Serial Bus (USB) protocol or IEEE 1394 (Firewire®) protocol.

Input/output circuits 103 may also be configured to coordinate data transfer between computer system 100 and one or more devices (e.g., other computing systems or integrated circuits) coupled to computer system 100 via a network. In one embodiment, input/output circuits 103 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 103 may be configured to implement multiple discrete network interface ports.

Clock generation circuit 104 may be configured to enable, configure and manage outputs of one or more clock sources. In various embodiments, the clock sources may be located in analog/mixed-signal circuits 105, within clock generation circuit 104, in other blocks with computer system 100, or come from a source external to computer system 100, coupled through one or more I/O pins. In some embodiments, clock generation circuit 104 may be capable of enabling and disabling (e.g., gating) a selected clock source before it is distributed throughout computer system 100. Clock generation circuit 104 may include registers for selecting an output frequency of a phase-locked loop (PLL), delay-locked loop (DLL), frequency-locked loop (FLL), or other type of circuits capable of adjusting a frequency, duty cycle, or other properties of a clock or timing signal.

Analog/mixed-signal circuits 105 may include a variety of circuits including, for example, a crystal oscillator, PLL or FLL, and a digital-to-analog converter (DAC) (all not shown) configured to generated signals used by computer system 100. In some embodiments, analog/mixed-signal circuits 105 may also include radio frequency (RF) circuits that may be configured for operation with cellular telephone networks and/or other communications technologies. Analog/mixed-signal circuits 105 may include one or more circuits capable of generating a reference voltage at a particular voltage level, such as a voltage regulator or band-gap voltage reference.

Power management unit 106 may be configured to generate a regulated voltage level on a power supply signal for processor complex 101, input/output circuits 103, memory circuit 102, and other circuits in computer system 100. In various embodiments, power management unit 106 may include one or more voltage regulator circuits, such as, e.g., a buck regulator circuit, configured to generate the regulated voltage level based on an external power supply (not shown). In some embodiments any suitable number of regulated voltage levels may be generated. Additionally, power management unit 106 may include various circuits for managing distribution of one or more power signals to the various circuits in computer system 100, including maintaining and adjusting voltage levels of these power signals. Power management unit 106 may include circuits for monitoring and/or managing power usage by computer system 100, including determining or estimating power usage by particular circuits. For example, power management unit 106 may determine power usage by each of a plurality of processor circuits in processor complex 101. Based on the determined power usage, power management unit 106 may allocate respective power budgets to some or all of the particular circuits.

Power management unit 106 may include circuits for monitoring and/or managing power usage by categories of tasks or processor threads being executed by processor complex 101. For example, in some scenarios, processor complex 101 may execute one or more tasks (or processor threads) that may be grouped into quality-of-service (QoS) tiers. The tasks may be grouped by any of various factors, such as task type, task status, an associated software application, etc.

For example, some tasks may directly support a user application in the focus of a graphical user interface (GUI), such that a user may be presently interacting with the application. For example, a video streaming application may have the focus, and the video. Such tasks may be referred to as belonging to a "focus" quality of service (QoS) tier. The focus tier may be handled with a high QoS, such as by the power management unit 106 allocating a high power budget to the associated tasks, to ensure sufficient processing resources to provide a positive user experience.

Other tasks may support a different user application that is not currently in the focus, but which the user may expect to continue operating. For example, a web browser may be open on the GUI, which may not have the focus, but which may continue to display changing graphics. The processor complex 101 may be executing tasks to process and display such graphics. Such tasks may be referred to as belonging to a "non-focus" QoS tier. The non-focus tier may, in some scenarios, be allowed to operate with a slightly lower QoS than the focus tier, such as by allowing allocation of a lower power budget to the associated tasks. Specifically, the user experience may not be impacted as drastically by a slight dip in performance of non-focus tasks, as compared to focus tasks. However, the user may still expect the computing device to maintain a certain level of performance with regard to the non-focus tasks.

Yet other tasks may support system utility operations, which may be referred to as belonging to a "utility" tier. In some scenarios, such tasks may be invisible to the user, but may be important to the continued functioning of the computer system 100. In some scenarios, such tasks may be delayed or reduced without immediate negative impact to the user experience. Thus, in some scenarios, the utility tier may be allowed to operate with a lower QoS, such as by allocating a lower power budget to the utility tier than to the focus or non-focus tiers.

Yet other tasks may support background operations, which may be referred to as belonging to a "background" tier. For example, an email application that is not currently displayed on the GUI may retrieve email messages from a remote server. The processor complex 101 may be executing tasks to receive, process, and store the email messages. In some scenarios, the user may be unaware that such tasks are being performed. In some scenarios, such tasks may be delayed, reduced, or omitted without noticeable impact to the user experience. Thus, in some scenarios, the background tier may be allowed to operate with a lower QoS, such as by allocating a lower power budget than that allocated to the utility tier.

Additional and/or alternative QoS tiers may be defined in other scenarios.

As a result of the power management unit 106 allocating a lower power budget for a QoS tier, tasks of that tier may be allocated fewer processing resources. For example, tasks of that tier may be allocated less frequent access to a processor; may be allocated to a high-efficiency processor, rather than to a high-powered processor; may be allocated less-frequent graphical updates; may be allocated less frequent access to communications circuitry, such as via the I/O circuits 103; etc.

Performance of tasks by the computer system 100, such as tasks associated with any of the tiers described above, may generate heat, as thermal waste. Management of thermal conditions within the computer system 100, and within the computing device generally, is important to prevent components from overheating and malfunctioning. Therefore, the power management unit 106 may include a thermal management unit 107, which may provide information regarding the thermal state of the device for use in power management decisions. For example, thermal management unit 107 may determine that a component of the computer system 100 is in danger of overheating, or, more generally, is producing an undesirable amount of heat. In response, power management unit 106 may reduce the power budget to that component, to reduce the thermal output. As another example, thermal management unit 107 may determine that the computer system 100, or the computing device as a whole, is reaching an undesirable temperature. In response, power management unit 106 may reduce the power budget to one or more components, or to one or more tasks, to reduce the thermal output.

However, as noted above, reducing the power budget to some tasks, such as tasks in the focus tier, may impact the user experience more significantly than reducing the power budget to other tasks, such as those in the background tier.

Therefore, the thermal management unit 107 may be configured to perform thermal management by QoS tier.

Similarly, management of thermal conditions may also be important to ensure a positive user experience with the computing device. For example, a user may have an unpleasant experience if an outer surface of the computing device becomes unpleasantly warm to the touch. This is especially relevant for mobile devices, such as laptop or tablet computers, which may be held by the user during use. As another example, a user may have an unpleasant experience if a cooling fan of the computing device becomes loud, e.g., as a result of increasing the fan's rate of rotation in an effort to cool the computing device.

It has been observed that users may be willing to accept conditions such as detectable warming of the outer surfaces or increased fan noise in scenarios in which the user expects the computing device to be heavily taxed, such as while running processing-intensive applications, such as video games or video editing. However, users may be less forgiving of such conditions when they do not expect the computing device to be heavily taxed. For example, a user may become annoyed if the computing device becomes unpleasantly warm or noisy while the user is merely typing an email. However, such conditions may occur as a result of background and/or utility tasks of which the user may be unaware. Thus, again, it may be beneficial for the thermal management unit 107 to perform thermal management by QoS tier.

It is noted that the embodiment illustrated in FIG. 1 includes one example of a computer system. A limited number of circuit blocks are illustrated for simplicity. In other embodiments, any suitable number and combination of circuit blocks may be included. For example, in other embodiments, security and/or cryptographic circuit blocks may be included.

Figure 2:
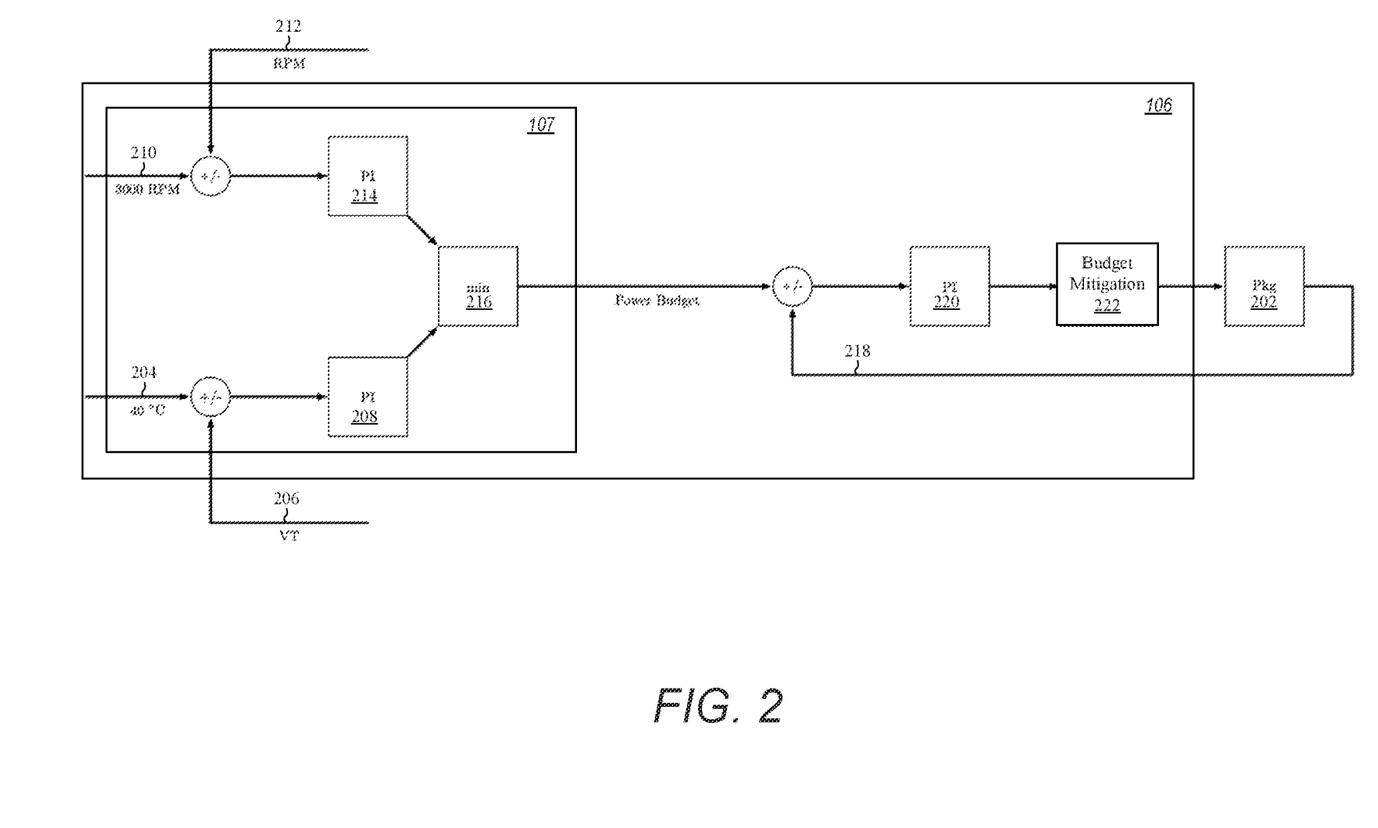
FIG. 2 illustrates a block diagram of an example closed-loop thermal control feedback system, according to some embodiments.

FIG. 2—Tier-Specific Thermal Control

FIG. 2 illustrates a block diagram of an example closed-loop thermal control feedback system, according to some embodiments. In some embodiments, the system illustrated may be included in the computer system 100 of FIG. 1. For example, as illustrated, the system includes the power management unit 106 (including the thermal management unit 107) and a power client package 202. The power client package 202 may represent one or more components of the computer system 100. Alternatively, the client package 202 may represent a set of tasks being executed by the processor complex 101, such as the tasks of a particular QoS tier. As illustrated in FIG. 2, the power budget allocated to the power client package 202 is influenced by the thermal management unit 107.

As illustrated, the thermal management unit 107 may receive a temperature threshold 204, which may represent a maximum desired temperature, or a temperature at (or above) which thermal mitigation may be introduced. In some scenarios, the temperature threshold 204 may be a fixed value. In other scenarios, the threshold may be dynamically determined. In the example illustrated, the temperature threshold 204 is currently 40° C.

The thermal management unit 107 may also receive a temperature measurement 206. In the example illustrated, the temperature measurement is shown as a virtual temperature (VT), which represents an estimated temperature of an outer surface, based on a temperature model utilizing known parameters, such as power usage, temperature measured at a point within the computer system 100, and/or other known parameters. For example, the VT may be estimated in accordance with any of the temperature estimation procedures disclosed in U.S. Pat. No. 8,306,772, incorporated by reference above. In other examples, the temperature measurement 206 may represent a temperature of an outer surface that is measured directly, or may represent a temperature at a different position in the computing device, such as at or near the processor complex 101. However, in the example illustrated, the VT is used, so as to estimate the temperature experienced by a user holding the computing device, even though measuring the actual temperature of the outer surface may not be feasible.

As illustrated, the temperature measurement 206 may be subtracted from the temperature threshold 204, and the difference may be provided to a proportional-integral (PI) controller 208 (or any other appropriate control loop mechanism). The error value output by the PI controller 208 may be provided to a min function 216.

As illustrated, the thermal management unit 107 may also receive a fan operation threshold 210, which may represent a maximum desired fan operation, or a fan operation level at (or above) which thermal mitigation may be introduced. In some scenarios, the fan operation threshold 210 may be a fixed value. In other scenarios, the threshold may be dynamically determined. In the example illustrated, the fan operation threshold 210 is an operating rate of 3000 RPM, which may be a rate at which the fan becomes noticeably noisy. In other examples, the fan operation threshold 210 may be measured in other units, such as decibels, power draw, etc.

The thermal management unit 107 may also receive a fan operation measurement 212. In the example illustrated, the fan operation measurement 212 is shown as an RPM measurement, which represents an estimated rotation rate of the fan, and may be estimated based on voltage, power draw, etc. In other examples, the fan operation measurement 212 may be measured in other units, such as voltage, decibels, power draw, etc. However, in the present example, the RPM is used, so as to estimate the noise level experienced by a user.

As illustrated, the fan operation measurement 212 may be subtracted from the fan operation threshold 210, and the difference may be provided to a PI controller 214 (or any other appropriate control loop mechanism). The error value output by the PI controller 214 may be provided to the min function 216.

The output of the min function 216 may represent a power budget for the power client package 202, and may be the minimum of the temperature measurement loop and the fan operation measurement loop. Thus, the power budget of the power client package 202 may be mitigated in response to either the computing device becoming uncomfortably warm to the touch or the cooling fan becoming unpleasantly noisy.

In some implementations, the min function 216 may receive one or more additional inputs. Such additional inputs may reflect additional thermal state metrics, other than current temperature measurement and fan speed, and may be based on additional thermal state thresholds, similar to the fan operation threshold 210 or the temperature threshold 204. In some implementations, the function 216 may perform an additional and/or alternative function, other than a minimum function.

The power budget output by the min function 216 may serve as an input to a further feedback loop. For example, an output 218 from the power client package 202 may be subtracted from the power budget, and the result may be provided to a PI controller 220 (or any other appropriate control loop mechanism). The error value output by the PI controller 214 may be provided to a budget mitigation function 222, which may provide final power allocation to the power client package 202. In some scenarios, the budget mitigation function 222 may receive additional inputs, which may account for other systems, such as battery state, power spikes, demand spikes, etc.

It should be understood that the block diagram of FIG. 2 is one example of many possible implementations. For example, in some scenarios, additional feedback loops may feed into the min function 216. For example, the thermal measurement 206 may also be subtracted from a second (e.g., higher) thermal threshold, and the difference may be provided to another PI controller, which may utilize different parameters than the PI controller 208. The other PI controller may be configured to produce a lower power budget in response to the thermal measurement 206 exceeding the second thermal threshold. Thus, the power budget may be incrementally mitigated as the thermal measurement reaches successive thresholds. Any number of thermal measurement loops and/or fan operation measurement loops may be used in this manner to provide finer control of the power budget for the power client package 202.

As another example, additional thermal measurement loops may receive a temperature measurement 206 measured at a different point. E.g., a first thermal measurement loop may utilize VT as the temperature measurement 206, as illustrated in FIG. 2, while a second thermal measurement loop may utilize a temperature measurement 206 measured at the processor complex 101 or elsewhere in the computer system 100. Similarly, a plurality of fan operation measurement loops may each receive a fan operation measurement 212 from a different fan.

As noted above, the power client package 202 may be (or include) a QoS tier, or a task or set of tasks included in a QoS tier. In some scenarios, the feedback system of FIG. 2 may be duplicated for each of a plurality of QoS tiers. Thus, each QoS tier may receive a separate power budget, and each power budget may be independently influenced by the thermal conditions of the computing device.

For example, a background QoS tier may be allocated power resources based on a first feedback system, in which the parameters of the PI controllers (e.g., 208, 214, and/or 220) are set such that the power budget of the background QoS tier is mitigated significantly in response to a high thermal measurement 206 and/or a high fan operation measurement 212. Specifically, as discussed above, a user may not expect high temperatures and fan noise as a result of background tasks of which the user is unaware. Thus, the power budget for such background tasks may be mitigated under such circumstances. Mitigation of the power budget for the background QoS tier may be an appropriate approach (as opposed to proportionately reducing power usage of the background QoS tier), because if the computing system 100 is not executing significant background tasks, then such tasks may not fully utilize the power budget of the background QoS tier, even while that power budget is mitigated. Thus, although the power budget of the background QoS tier may be mitigated, actual power usage of the tasks included in the background QoS tier may be mitigated only if the background tasks become so significant as to become a significant contributor to the undesirable thermal conditions.

As another example, a utility QoS tier may be allocated power resources based on a second feedback system, in which the parameters of the PI controllers are set such that the power budget of the utility QoS tier is mitigated somewhat less than that of the background QoS tier. Alternatively, or additionally, mitigation of the power budget of the utility QoS tier may be initiated at a different thermal threshold and/or a different fan operation threshold than the background QoS tier.

Similarly, the power budget of a non-focal QoS tier may be mitigated even less than that of the utility QoS tier. The power budget of a focal QoS tier may be mitigated less yet, or not at all, in response to a high thermal measurement 206 and/or a high fan operation measurement 212, e.g., because a user may be more accepting of high temperature and/or high fan noise while high-power processes are operating in the focus of the GUI. E.g., the user may be willing to accept such thermal conditions in exchange for allocating significant power to applications with which the user is actively interacting. In some scenarios, reducing the power budget allocated to other QoS tiers may make additional power budget available for the focal QoS tier.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., any one or more of the devices or systems illustrated in any of the figures) may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or any combination of the method embodiments described herein, or any subset of any of the method embodiments described herein, or any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for power management in a computing device, the method comprising:
generating a first power budget for a first quality of service (QOS) tier;
generating a second power budget for a second QoS tier; and
allocating resources to each of the first QoS tier and the second QoS tier such that power consumption of the allocated resources does not exceed the power budget of the respective QoS tier, wherein allocating resources to a QoS tier includes managing how frequently processing tasks included in the QoS tier have access to a processor.

2. The method of claim 1, wherein at least one of the first QoS tier or the second QoS tier comprises tasks associated with a particular software application being executed by the computing device.

3. The method of claim 1, wherein the first QoS tier comprises processing tasks supporting any software application that is presently in the focus of a graphical user interface (GUI) of the computing device, and wherein the first QoS tier has a larger power budget than the second QoS tier.

4. The method of claim 1, wherein allocating resources to a QoS tier comprises at least one of:
managing voltage levels to one or more processors executing processing tasks included in the QoS tier;
determining which processor of a plurality of processors to allocate for executing a task included in the QoS tier, wherein the plurality of processors have different power efficiencies;
managing how frequently graphical updates are performed for a task included in the QoS tier; or
managing how frequently a task included in the QoS tier is provided access to communications circuitry.

5. The method of claim 1, wherein generating the first power budget comprises adjusting the first power budget based on an estimate of a temperature level at a particular point within the computing device.

6. The method of claim 5, wherein the temperature level represents an estimated temperature at a location on an exterior case of the computing device.

7. The method of claim 1, wherein generating the first power budget comprises adjusting the first power budget based on an estimate of a current rotation rate of a fan of the computing device.

8. The method of claim 1, wherein:
generating the first power budget comprises adjusting the first power budget based on a first set of thermal feedback loops; and
generating the second power budget comprises adjusting the second power budget based on a second set of thermal feedback loops.

9. An apparatus comprising:
power management circuitry configured to generate a respective power budget for each of a plurality of quality of service (QOS) tiers, wherein each of the QoS tiers includes one or more processing tasks; and
at least one processor communicatively coupled to the power management circuitry, the at least one processor configured to perform the processing tasks included in plurality of QoS tiers in a manner such that power consumption of the processing tasks included in each QoS tier does not exceed the power budget of the respective QoS tier, wherein performing the processing tasks included in the respective QoS tier in a manner such that power consumption of the processing tasks included in the respective QoS tier does not exceed the power budget of the respective QoS tier includes limiting how frequently the processing tasks included in the respective QoS tier have access to the at least one processor.

10. The apparatus of claim 9, wherein a first QoS tier of the plurality of QoS tiers includes tasks associated with a particular software application.

11. The apparatus of claim 9, wherein a first QoS tier of the plurality of QoS tiers comprises processing tasks supporting any software application that is presently in the focus of a graphical user interface (GUI), and wherein the first QoS tier has a larger power budget than a second QOS tier of the plurality of QoS tiers.

12. The apparatus of claim 9, wherein performing the processing tasks included in a first QoS tier of the plurality of QoS tiers in a manner such that power consumption of the processing tasks included in the first QoS tier does not exceed the power budget of the first QOS tier comprises at least one of:
performing the processing tasks included in the first QoS tier with a reduced voltage level at the at least one processor;
performing the processing tasks included in the first QoS tier with a high-efficiency processor of the at least one processor;
limiting how frequently graphical updates are performed for a task included in the first QOS tier; or
limiting how frequently a task included in the first QoS tier is provided access to communications circuitry.

13. The apparatus of claim 9, wherein generating a power budget for a first QoS tier of the plurality of QoS tiers comprises adjusting the power budget for the first QoS tier based on an estimate of a temperature level.

14. The apparatus of claim 13, wherein the temperature level represents an estimated temperature at a location on an exterior case of a computing device in which the apparatus is located.

15. The apparatus of claim 13, wherein generating the power budget for the first QoS tier comprises reducing the power budget for the first QoS tier based on the estimate of the temperature level exceeding a predetermined threshold.

16. The apparatus of claim 9, wherein generating a power budget for a first QoS tier of the plurality of QoS tiers comprises adjusting the power budget for the first QoS tier based on an estimate of a current rotation rate of a fan controlled by the apparatus.

17. The apparatus of claim 16, wherein generating the power budget for the first QoS tier comprises reducing the power budget for the first QoS tier based on the estimate of the current rotation rate of the fan exceeding a predetermined threshold.

18. The apparatus of claim 9, wherein:
the power management circuitry comprises a plurality of thermal feedback loops; and
generating a respective power budget for each of the plurality of QoS tiers comprises adjusting the respective power budget based on a respective set of the thermal feedback loops.

19. The apparatus of claim 18, wherein generating the respective power budget for each of the plurality of QoS tiers comprises:
reducing the power budget of a first QoS tier by a first amount in response to detecting that a current thermal state metric meets a first thermal state threshold;
reducing the power budget of a second QoS tier by a second, different amount in response to detecting that the current thermal state metric meets the first thermal state threshold; and
reducing the power budget of a third QoS tier in response to detecting that the current thermal state metric meets a second, different thermal state threshold.

20. A computing device comprising:
power management circuitry configured to:
allocate a respective power budget to each of a plurality of quality of service (QOS) tiers, wherein each of the QoS tiers includes one or more processing tasks; and
control a thermal state of the computing device by adjusting the respective power budget of one or more QoS tiers of the plurality of QoS tiers, based on one or more current thermal state metrics of the computing device, wherein the respective power budgets of the one or more QoS tiers may be adjusted independent of each other, wherein adjusting the respective power budgets of the one or more QoS tiers includes adjusting how frequently the one or more processing tasks included in a respective QoS tier have access to a processor of the computing device.

* * * * *